United States Patent [19]

Itakura

[11] Patent Number: 4,486,821
[45] Date of Patent: Dec. 4, 1984

[54] POWER SOURCE FOR A DEVELOPING BIAS

[75] Inventor: Haruo Itakura, Hachioji, Japan

[73] Assignee: Konishiroku Photo Industry Co., Ltd., Tokyo, Japan

[21] Appl. No.: 398,890

[22] Filed: Jul. 16, 1982

[30] Foreign Application Priority Data

Jul. 22, 1981 [JP] Japan .................. 56-115551

[51] Int. Cl.³ ........................................... H02M 3/335
[52] U.S. Cl. ........................................ 363/18; 363/97
[58] Field of Search ................... 363/18–21, 363/86, 124, 97; 323/266, 299, 303, 349, 351

[56] References Cited

U.S. PATENT DOCUMENTS 3,376,489 4/1968 Crayton ........................ 363/20
3,742,330 6/1973 Hodges et al. ............... 323/266 X
4,251,857 2/1981 Shelly ............................ 323/266

Primary Examiner—Peter S. Wong
Attorney, Agent, or Firm—Jordan B. Bierman

[57] ABSTRACT

A power source for a developing bias comprises an input power source, a standard voltage generating means which generates standard voltage employing the input power source, a pulse transformer on which the standard voltages are impressed as a direct current voltage to be switched on and off, clock pulse generating means which generates clock pulses with a fixed cycle and fixed duty ratio, and switching means driven by the clock pulses for switching the pulse transformer to provide a regulated output voltage. The circuit of the invention eliminates the need for a feedback loop to compensate for load variations.

3 Claims, 5 Drawing Figures

POWER SOURCE FOR A DEVELOPING BIAS

BACKGROUND OF THE INVENTION

1. Field of the Invention

The present invention relates to the improvement of a power source for the developing bias to be impressed on the developing section of an electrostatic copying machine.

2. Description of the Prior Art

Electrostatic latent images formed on the electrophotographic photosensitive receptor are developed at the developing section and a bias voltage is impressed between the electrically conductive supporting member of the photosensitive receptor and the developing sleeve in order to prevent a fog, namely, a grey background to be caused.

A circuit shown in FIG. 1 or FIG. 2 has been employed so far as a circuit to impress the bias voltage. Regarding the circuit in FIG. 1, it has a drawback that output voltage setting requires elements for high-voltage and switching elements for high-voltage (QA, QB, QC, ...) in the amount of number of switching steps (A, B, C, ...) are required for high-voltage switching. A circuit to control the output variation in FIG. 2, that is, a circuit to control the pulse width for switching by means of a feedback loop has drawbacks that it is difficult to obtain steadily the switching of output voltage and variable actions in a broad range and further the circuit will be complicated and expensive because an error-amplifier and others are needed. Incidentally, aforesaid power supply for developing bias in the copying machine is the one wherein the voltage of about 500 V is impressed between said units and a current of about 10 μA flows for example, and it is clear from the foregoing that the supplying power source has only to be a power source with constant voltage to be supplied to the load with a very few variation.

SUMMARY OF THE INVENTION

The object of the present invention is to solve the drawbacks of conventional technologies and to constitute the abovecaptioned system with a simple circuit and aforesaid object is attained by the power source for the developing bias comprising (a) an input power source, (b) a standard voltage generating means which generates standard voltage employing said input power source, (c) a pulse transformer on which a standard voltage generated by said standard voltage generating means is impressed as a direct current voltage to be switched off, (d) a clock pulse generating means which generates clock pulses with fixed cycle and fixed duty ratio, and (e) a switching means driven by clock pulses generated by said clock pulse generating means which switches said pulse transformer. An inverter circuit means a circuit which changes DC power to AC power. Further, by using no feedback loop, the control has been simplified.

DETAILED DESCRIPTION OF THE PREFERRED EMBODIMENTS

Figure 1:
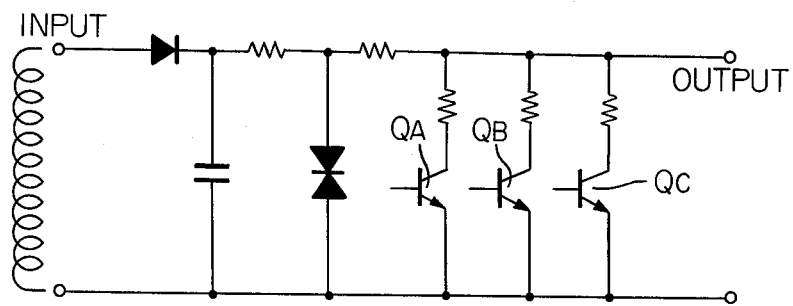
FIG. 1 and FIG. 2 show the conventional circuit to impress the bias voltage.

A detailed explanation will be made as follows referring to the drawings.

Figure 3:
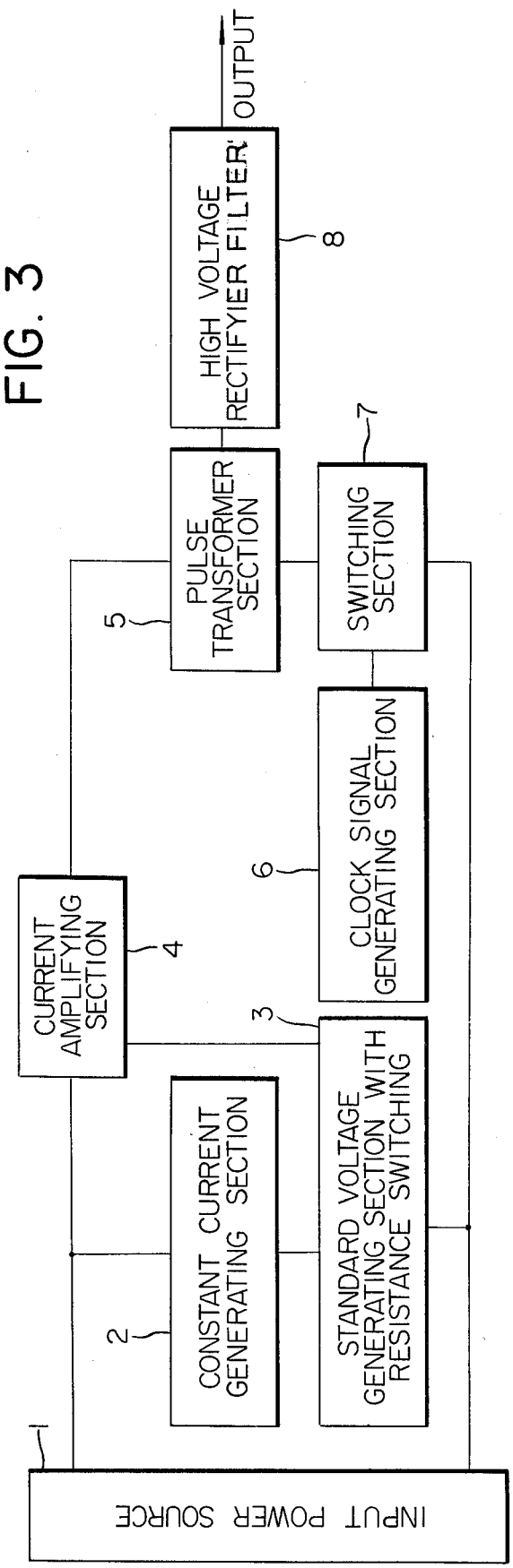
FIG. 3 is a block diagram of an example of the present invention.

FIG. 3 is a block diagram showing an example of the present invention. In the diagram, the voltage supplied from the unstable input power source 1 generates the prescribed constant current in the constant current section 2 and the generated constant current is impressed on the selected resistance of the standard voltage generating section 3 and the standard voltage obtained therefrom is supplied to the current amplifying section 4.

The standard voltage is amplified by the current amplifying section 4 and is impressed on the pulse transforming section 5 as a direct current voltage to be switched (Vsc). The pulse transforming section 5 operates by driving the switching section 7 with the clock pulse generated by the clock pulse generating section 6. The clock pulse generating section 6 generates clock pulses with fixed cycle and fixed duty ratio.

The high voltage output thus obtained at the pulse transforming section 5 is rectified and smoothed in the high voltage rectifying section 8 and then is picked out as an output.

Incidentally, in the power source for a developing bias explained above, the standard voltage generating means including the constant current generating section 2 and the standard voltage generating section 3 may be the one wherein the constant voltage element (Zener diode or the like) that is known polularly is used for the preparation of constant voltage and the divided voltage thereof is used. Further, the current amplifying section 4 is not needed in the case of small power and the clock pulse generating section 6 can easily be constituted with a logic element or an operational amplifier.

Half-wave rectification, full-wave rectification, centertap rectification, fly-wheel method and double-voltage rectification method and others can be used as a high voltage rectifying and smoothing method of the high voltage rectifier filter 8.

When the load variation is large, the output voltage is detected and the output itself is compared with the standard voltage, thereby the voltage to be impressed is controlled and high voltage power source with a high stability can be formed. In the power source for a developing bias, however, the current of 10 μA is maximum as described above under about 500 V as an example and therefore the power source to be supplied has only to be a constant voltage power source to be supplied to the load with extremely few variation and it is not necessary to form the so-called feedback loop.

Figure 5:
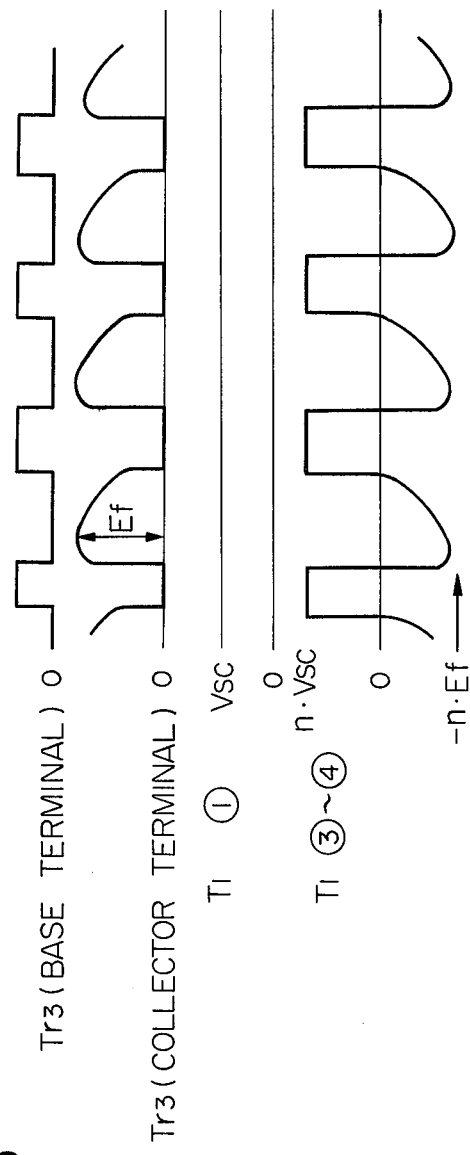
FIG. 5 is a timer chart diagram of the circuit shown in FIG. 4.
Figure 4:
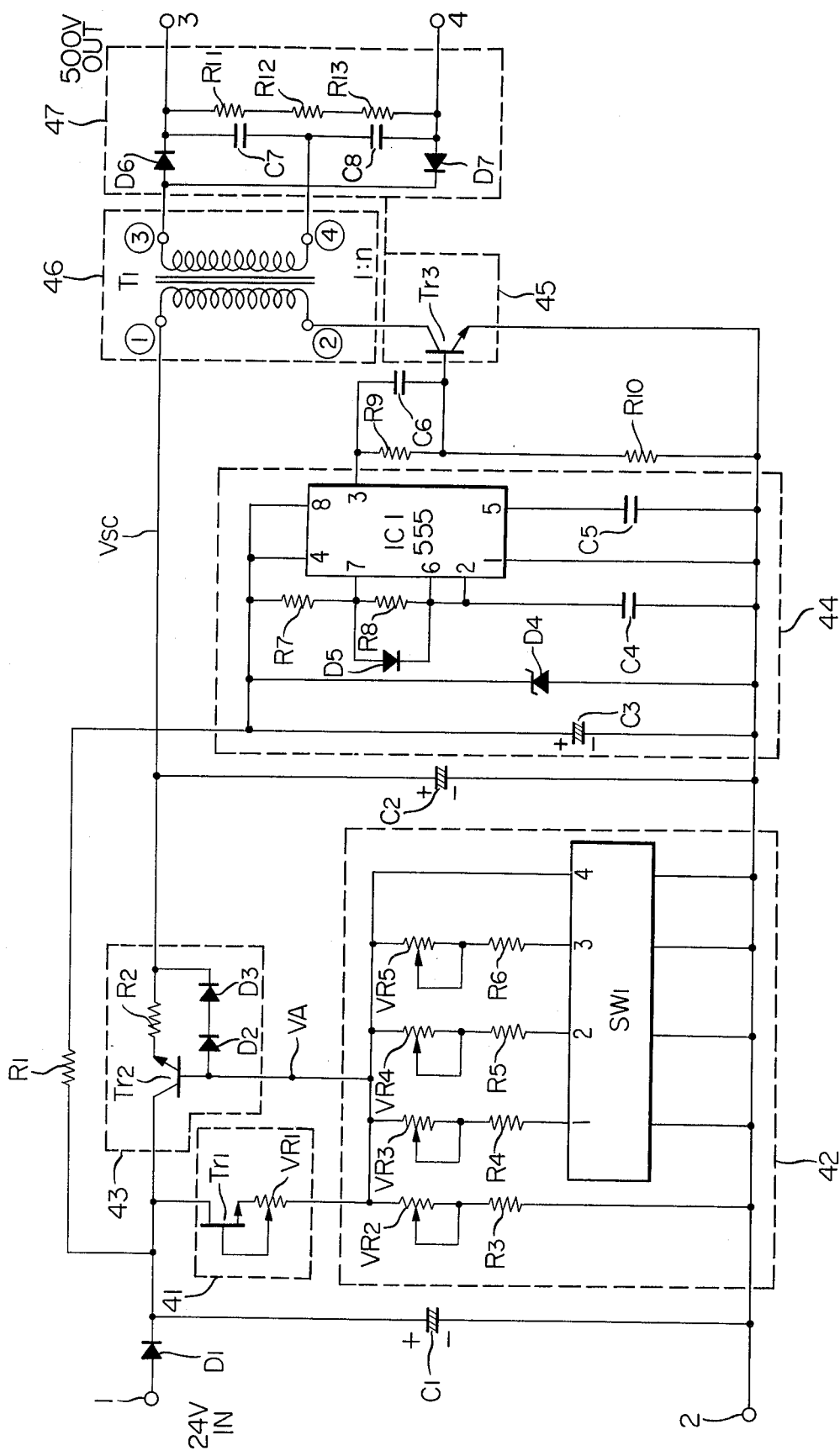
FIG. 4 is an example of the circuit corresponding to the block diagram is FIG. 3

FIG. 4 shows an example of the concrete circuit diagram for the composition of FIG. 3 wherein an example of the present invention is shown and FIG. 5 shows a timing chart for the base and collector of the transistor Tr3 on FIG. 4 and for terminal sections 1-4 of the pulse transformer T1.

In FIG. 4, there is composed a circuit including the constant current generating section 41 having a field-effect transistor Tr1, the standard voltage generating section 42 comprising lines of resistance and variable resistances and a changeover switch SW1, the current amplifying section 43 comprising the transistor Tr2 and others, the clock signal generating section 44 comprising the Integrated Circuit for timer IC1 and others, the switching section 45 comprising the transistor Tr3, the pulse transforming section 46 comprising the pulse transformer T1 and the high voltage rectifier filter 47 comprising diodes, condensers and resistances, as a concrete example of the block diagram in FIG. 3.

Even if the input power source (24 V in FIG. 4) varies, the VA voltage in FIG. 4 is kept constant so long as the bias setting remains unchanged, thus Vsc itself keeps the state of the stabilized direct current voltage.

The voltage to be impressed, namely, the voltage Vsc to be impressed on the terminal 1 of the pulse transformer T1 is the one determined by the inverted system wherein the variable output voltage value is set by switching the standard voltage generating section 42 and the switching cycle of the transistor Tr3 and the duty ratio are made constant. Ef in FIG. 5 shows the fly-back voltage at the OFF state of the transistor Tr1. By rectifying the output between 3 and 4 of the pulse transformer T1 thus obtained, the direct current voltage of the power source for the developing bias is obtained. The setting of the output voltage is determined by the height of the voltage Vsc or by the winding ratio (1:n) of the pulse transformer T1.

Figure 2:
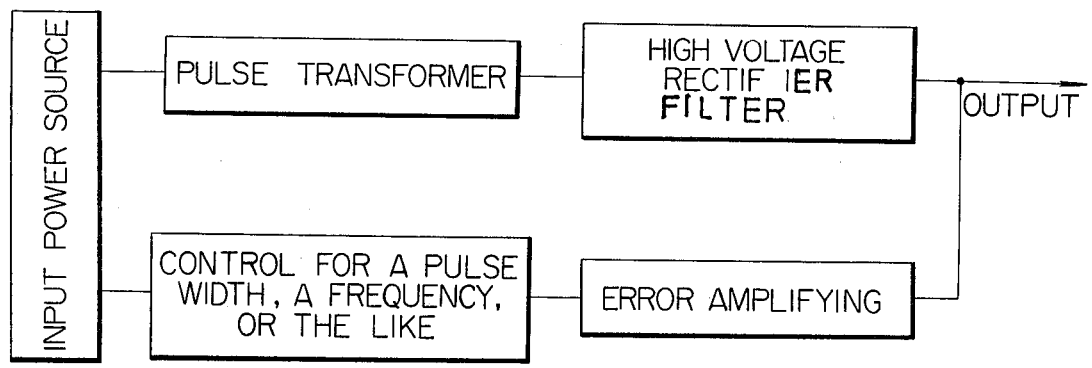

The conventional circuit shown in FIG. 1 or FIG. 2 has had following drawbacks.

(1) For the switching of output voltage setting, high voltage-resistant switch elements in the amount corresponding to the number of all switching steps are needed.

(2) Voltage setting is entirely dependent on the varistor characteristic. In case of the voltage change made by resistance division, the variable resistor that is high voltage-resistant is needed.

(3) It is inefficient because much wasteful electric power is consumed for the acquirement of the varistor characterisitic.

(4) The range for variation of the output with which the stable operation is obtained is narrow with a general pulse modulation system.

While, the present invention can attain it with a simple circuit and further it has following merits.

(a) The output voltage variation in broad range can stably be attained even on the side of low voltage.

(b) The stability of operation is obtained because of the operation with the driving pulse of which the pulse width is fixed. Further, the protection of the switching element for a short circuit of output is possible.

(c) Owing to the driving with a high frequency (20 KHz–50 KHz), it is possible to reduce the size of a pulse transformer and to lower the capacity of a condenser which is used in a high voltage rectifier filter.

Owing to the present invention, the power source for a developing bias having aforesaid merits has been attained and the present invention shall not naturally be restricted to aforesaid example.

What is claimed is:

1. In a copying machine having a power source for controlling a bias voltage to be supplied to a developing device, an improved power source comprising:
    (a) an input power source,
    (b) a standard voltage generating means, including changeover switch means for selecting a desired standard voltage from a set of standard voltages, and a constant current generating section for providing a direct current at the selected standard voltage employing said input power source,
    (c) a pulse transformer on which said standard voltage generated by said standard voltage generating means is impressed as a direct current voltage through said constant current generating section,
    (e) a clock pulse generating means which generates clock pulses with a fixed cycle and fixed duty ratio, and
    (f) a switching means driven by clock pulses generated by said clock pulse generating means for switching said pulse transformer to provide a stable high voltage output.

2. A power source for a developing bias as set forth in claim 1 wherein a feedback loop is not formed.

3. A power source for a developing bias as set forth in claim 1 or 2 wherein a voltage generated when a constant current runs through a changeable resistance is a standard voltage and is used as a direct current voltage to be switched.

* * * * *